March 20, 1956  R. WADDELL  2,738,812
PORTABLE RECIPROCATING POWER SAW
WITH ANGULARLY ADJUSTABLE BLADE
Filed Sept. 16, 1953
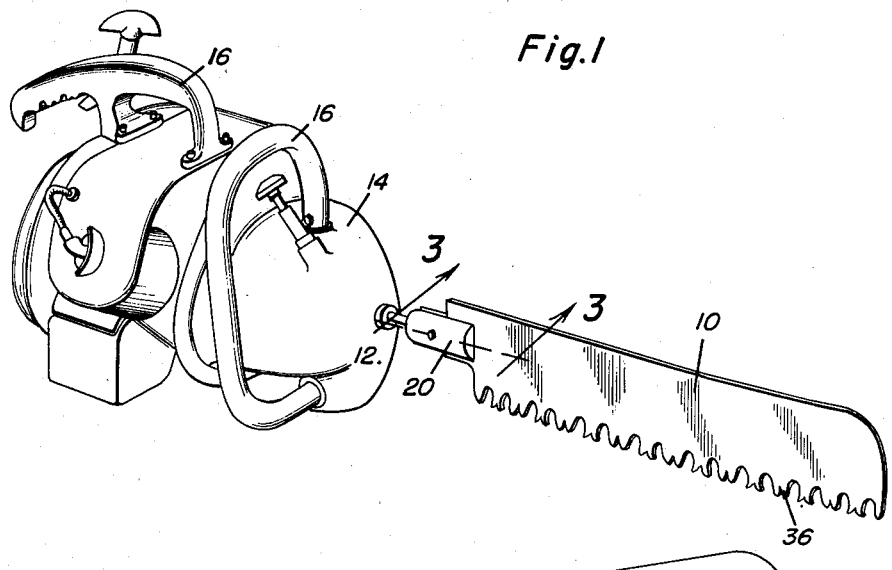
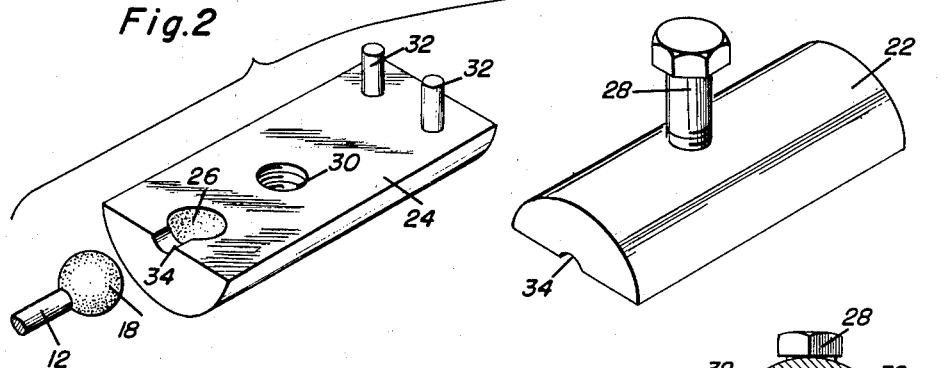
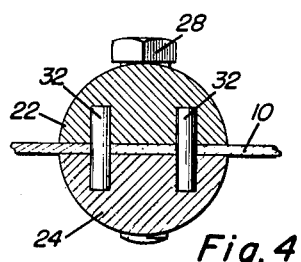
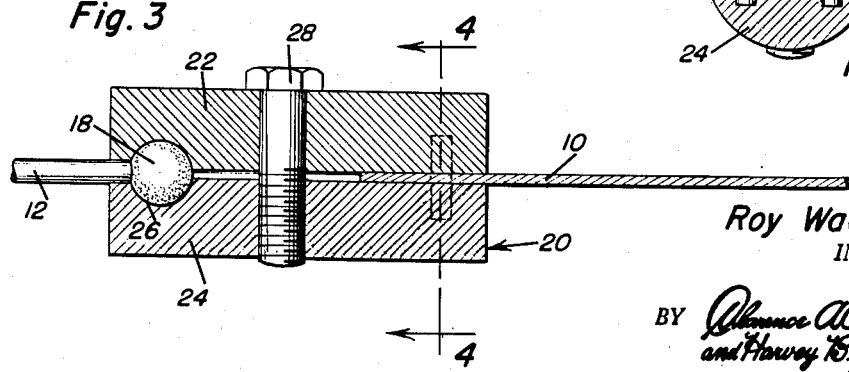
Roy Waddell
INVENTOR.

United States Patent Office 2,738,812
Patented Mar. 20, 1956

2,738,812

PORTABLE RECIPROCATING POWER SAW WITH ANGULARLY ADJUSTABLE BLADE

Roy Waddell, North Creek, N. Y.

Application September 16, 1953, Serial No. 380,521

1 Claim. (Cl. 143—68)

This invention relates to a reciprocating saw, and more specifically provides a power saw employing a reciprocating cut-off saw.

An object of this invention is to provide a portable power saw, having a portable motor with a reciprocating drive shaft and a saw blade connected to said drive shaft for reciprocation therewith.

Another object of this invention is to provide a portable power saw having a reciprocating saw member which is adjustable universally in relation to the portable motor drive shaft.

A further object of this invention is to provide a novel connection between a portable motor and a reciprocating cross-cut saw.

Yet another object of this invention is to provide a reciprocating saw having a novel connection to a portable motor which is simple in construction, easy to manipulate and inexpensive to manufacture.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a perspective view showing the reciprocating saw of this invention in assembled relation on a portable motor;

Figure 2 is an exploded detailed perspective view showing the elements of the connection between the motor drive shaft and the saw member;

Figure 3 is a longitudinal, vertical cross section taken substantially along section line 3—3 of Figure 1 showing details of the connection member in assembled relation; and Figure 4 is a transverse, vertical section taken substantially along section line 4—4 of Figure 3 showing details of the saw holding pins.

Referring now more specifically to Figure 1 of the drawings, it will be seen that the numeral 10 generally designates an elongated saw operatively connected to a reciprocating drive shaft 12 of a portable gasoline motor 14 having suitable carrying handle 16 thereon and the usual throttle control and clutch mechanism for reciprocating the saw 10 during the cutting operation.

Referring now more specifically to Figures 2–4, it will be seen that the drive shaft 12 is provided with a ball 18 on the end thereof and the ball 18 has a roughened outer surface. A connection member 20 having a pair of complementary members 22 and 24 both of which are semi-cylindrical in shape are positioned about the ball end 18 and the end of the saw 10. Each of the members 22 and 24 are provided with a half socket in the nature of a concave recess 26 with the surface thereof roughened to grip the roughened surface of the ball end 18. The member 22 has a bore therein for receiving a clamp bolt 28 and the member 24 has a threaded bore 30 therein for threadably engaging the threads of the bolt 28 wherein the bolt 28 clamps the members 22 and 24 together. Each of the members 22 and 24 opposite the recess portion 26 are provided with a pair of spaced bores for receiving a pair of dowel pins and the end of the saw blade 10 has suitable apertures for receiving the dowel pins 32. As best seen in Figure 2, the recess portion 26 has a cylindrical portion forming an entrance to the recess portion 26. It will be noted that the recess portion 34 snugly engages the cylindrical portion of the drive shaft 12 thereby precluding any transverse angular movement of the saw 10. Further, it will be noted in Figure 4 that the dowel pins 32 do not extend completely through the connection members 22 and 24 wherein the dowel pins are captive and held rigid with the assembly.

The operation of the device will be readily understood. The two members 22 and 24 are placed over the saw member 10 with the dowel pins 32 engaging suitable apertures in the end of the saw and the ball end 18 of the drive shaft 12 placed in the socket recesses 26 and the clamping bolt 28 is threaded into the screw threaded bore 30 and drawn tightly against the member 22 thereby clamping the members 22 and 24 together in tight frictional engagement with the ball end 18. The recess socket 26 and the ball 18 are both roughened for better frictional gripping and it will be understood by loosening the bolt 28 the saw 10 may be adjusted about its longitudinal axis and the longitudinal axis of the drive shaft 12 thereby affording a cutting edge such as teeth 36 in any direction about the longitudinal axis of the drive shaft.

If it is desirable to run the connector in a guide, the bore on one-half of the connector may be counter-bored to receive a nut and washer while the other half of the connector may be slotted to receive a T-headed clamp bolt thereby providing a smooth outer surface on the connector.

The saw 10 may be of any suitable nature or a discarded conventional type cross-cut saw may be used with one portion of the new saw rounded to afford a smooth outer end. The motor 14 may be of any conventional design with a special ball ended drive shaft 12.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claim.

What is claimed as new is as follows:

A powered, portable reciprocating saw comprising a portable prime mover having carrying handles thereon and a reciprocating drive shaft extending therefrom, a ball member integral with the free end of said drive shaft, an elongated saw blade having teeth on one edge thereof and being substantially rigid whereby the blade is self-sustaining, and connecting means between the saw blade and drive shaft, said means including a pair of semi-cylindrical members with each member having a semi-spherical recess in the flat surface thereof, said saw blade having a pair of spaced apertures, dowel pins extending through the apertures in the saw blades with one end of the pins being rigid with one of said semi-cylindrical members and receivable in bores in the other semi-cylindrical member, and a fastening bolt extending transversely through said semi-cylindrical members for simultaneously clamping the semi-cylindrical members to the blade and the ball member, said saw blade, connecting means and free end of the drive shaft being free of obstructions to permit adjustment of the saw blade in any longitudinal plane about the longitudinal axis of the saw blade and drive shaft, said ball member and semi-spherical recesses having roughened surfaces for positively gripping therebetween in angular position, each of said semi-cylindrical members having a semi-cylindrical groove extending from the semi-spherical recess to the adjacent end edge thereof for clampingly encircling the drive shaft adjacent the ball member to prevent relative angular movement about a transverse axis between the drive shaft and saw blade.

References Cited in the file of this patent

UNITED STATES PATENTS

| | | |
|---|---|---|
| 812,507 | Lupernig | Feb. 13, 1906 |
| 892,105 | White | June 30, 1908 |
| 945,828 | Webster et al. | Jan. 11, 1910 |
| 973,319 | Thunern et al. | Oct. 18, 1910 |
| 1,378,963 | Lagus | May 24, 1921 |
| 1,763,500 | Bower | June 10, 1930 |
| 2,139,147 | Blum | Dec. 6, 1938 |
| 2,588,477 | Briggs | Mar. 11, 1952 |
| 2,627,882 | Kleinsmith | Feb. 10, 1953 |